United States Patent [19]

Hopkins

[11] Patent Number: 4,676,490

[45] Date of Patent: Jun. 30, 1987

[54] LOG HOLDER

[76] Inventor: Arthur J. Hopkins, 4833 Colby Ave., Everett, Wash. 98203

[21] Appl. No.: 743,316

[22] Filed: Jun. 10, 1985

[51] Int. Cl.[4] .......... B23Q 1/00

[52] U.S. Cl. .......... 269/53; 269/296; 269/309

[58] Field of Search .......... 269/289, 296, 309, 909, 269/53

[56] References Cited

U.S. PATENT DOCUMENTS

| | | | |
|---|---|---|---|
| 654,134 | 7/1900 | Clark | 269/296 |
| 1,363,478 | 12/1920 | Lyon | 269/296 |
| 1,458,738 | 6/1923 | Teeken . | |
| 1,798,340 | 3/1931 | Thewes . | |
| 2,709,384 | 5/1955 | Harris | 81/41 |
| 4,241,772 | 12/1980 | Scherer | 269/289 |
| 4,258,907 | 3/1981 | Roberts et al. | 269/69 |
| 4,362,295 | 12/1982 | Ford | 269/69 |

FOREIGN PATENT DOCUMENTS

| | | | |
|---|---|---|---|
| 2735777 | 2/1979 | Fed. Rep. of Germany | 269/296 |
| 2916831 | 11/1980 | Fed. Rep. of Germany | 269/296 |

*Primary Examiner*—Frederick R. Schmidt
*Assistant Examiner*—Judy J. Hartman
*Attorney, Agent, or Firm*—Christensen, O'Connor, Johnson & Kindness

[57] ABSTRACT

A log holder for supporting a log in a horizontal orientation by engaging one end of the log, thereby leaving the other end free for cutting. The holder includes a base (12), a frame (20) extending upwardly from the base, upper (24) and lower (22) supports mounted to the frame above the base, and a counterweight support (26). The lower support includes an upwardly facing first contact surface (56). The upper support includes a downwardly facing second contact surface (70, 72, 74) that is horizontally spaced from the first contact surface in a first direction. The lower and upper contact surfaces are vertically positioned with respect to one another such that one end of the log (10) can be supported therebetween in a generally horizontal orientation, with the log extending from the lower support in a direction opposite the first direction. The counterweight support is mounted to the frame above the base and is horizontally spaced from the upper support in the first direction. The upper support may include a plurality of downwardly facing second contact surfaces of different sizes. The holder may further comprise an auxiliary lower support (28) adjustably and horizontally spaced from the first mentioned lower support for supporting short logs, and a projection extending from adjacent the upper support towards the lower support for spearing one end of a log.

8 Claims, 4 Drawing Figures

LOG HOLDER

FIELD OF THE INVENTION

The present invention relates to a holder for supporting an elongated object such as a log above the ground in a generally horizontal orientation.

BACKGROUND OF THE INVENTION

When a log is cut by a chainsaw, it is advantageous to hold the log in such a way so as to avoid having a supporting surface immediately beneath the section of the log being cut. One widely used technique is to support the log between two or more sawhorses or sawbucks. The disadvantage of this approach is that the log sections must continuously be repositioned when the log is to be cut into more than two pieces. Furthermore, it may be unsafe to support a log at two points on opposite sides of the section being cut, because sagging of the log when it is partially cut can cause the chainsaw to kick back towards the operator.

The repositioning and kickback problems can be solved if the log is supported above the ground by a log holder that engages only one end of the log. The log can then be cut into any number of sections by starting at the far end of the log away from the support and working toward the support. One or more log holders capable of such a cantilevered support have been described in the prior art. Such prior log holders, however, have suffered from a number of limitations. For example, for stability, prior cantilevered log holders have been constructed with their ground-contacting bases extending beneath the log for a considerable distance, thereby increasing the size of the log holder and increasing the chance of interference between the base and the operator of a chainsaw. In addition, prior cantilevered log holders have failed to provide satisfactory means for accommodating logs at different diameters. Finally, prior cantilevered log supports have not been capable of supporting very short logs, and the final cut for cutting a log into cordwood therefore typically has to be performed without use of the log holder.

SUMMARY OF THE INVENTION

The present invention provides a holder for supporting an elongated object such as a log. The object is supported in a generally horizontal orientation by engaging only one end thereof, thereby leaving the other end free for cutting the object or log into sections.

In a preferred embodiment, the holder of the present invention comprises a base, a frame extending upwardly from the base, lower and upper supports mounted to the frame above the base, and a counterweight support. The lower support includes an upwardly facing first contact surface. The upper support includes a downwardly facing second contact surface that is horizontally spaced from the first contact surface in a first direction. The lower and upper contact surfaces are vertically positioned with respect to one another such that one end of the elongated object can be supported therebetween in a generally horizontal orientation, such that the elongated object extends from the lower support in a second direction opposite the first direction. The counterweight support is mounted to the frame above the base and is horizontally spaced from the upper support in the first direction.

The upper support may comprise a plurality of downwardly facing, horizontally spaced, second contact surfaces. Each second contact surface has a semicircular shape, with the diameters of the second contact surfaces decreasing along the first direction. The counterweight support may comprise a bar having one end attached to the frame and an opposite end that includes attachment means such as a hook for the counterweight. The base extends horizontally to a position beneath attachment means, such that the holder is stable when a counterweight is attached prior to an object being supported between the upper and lower contact surfaces. The holder may further comprise an auxiliary lower support adjustably and horizontally spaced from the first-mentioned lower support. The auxiliary lower support is useful in supporting very short logs, such as those encountered when the final cut is made. When not required, the auxiliary lower support can be moved away from its active position to simplify operation of the holder. The holder may further comprise a projection extending from adjacent the upper support in the second direction, the projection being adapted to spear one end of the object.

DETAILED DESCRIPTION OF THE INVENTION

Figure 1:
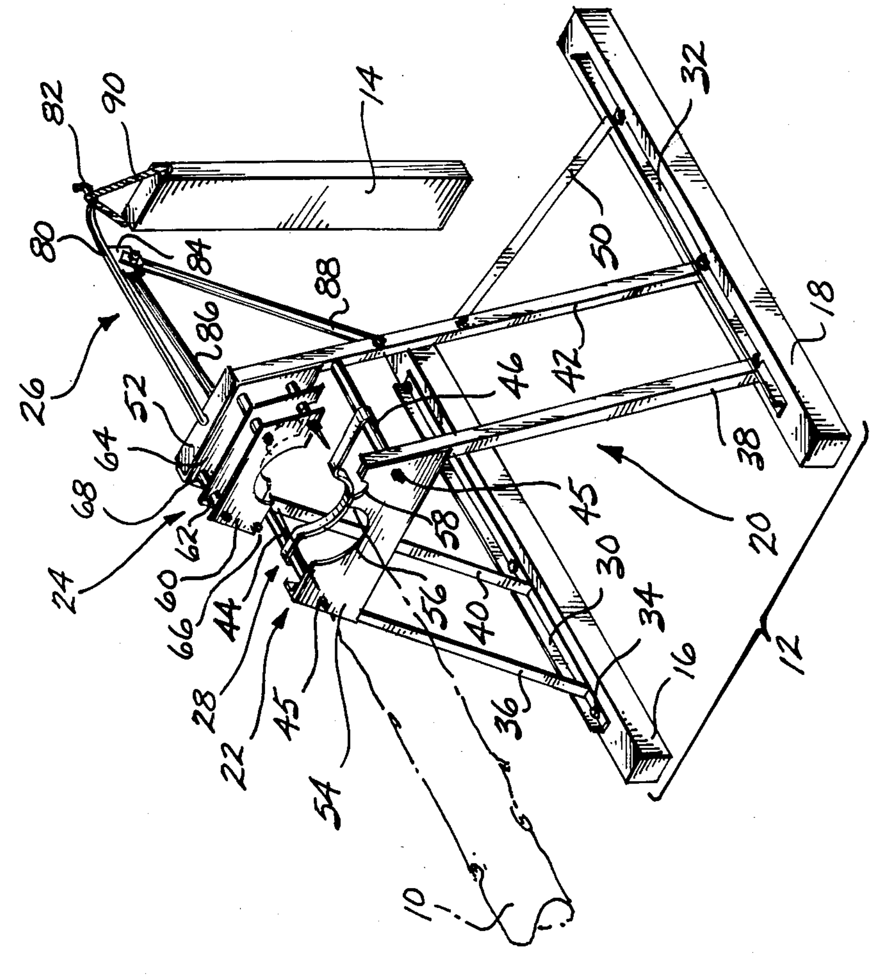
FIG. 1 is a left, front perspective view of a log holder according to the present invention.
Figure 3:
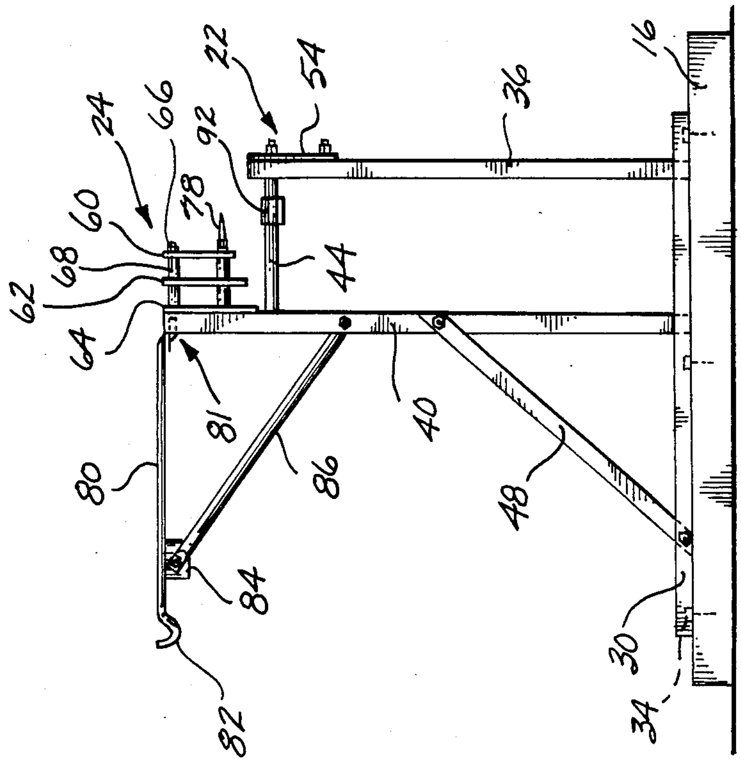
FIG. 3 is a right side elevational view of the log holder of FIG. 1.

One preferred embodiment of the log holder of the present invention is illustrated in FIGS. 1–4. Referring initially to FIG. 1, the log holder includes base 12 and frame 20 extending upward from the base. Mounted to and supported by the frame are lower support 22, upper support 24, counterweight support 26 and auxiliary lower support 28. Log 10 can be supported between the upper and lower supports such that the log extends in a forward direction (to the left in FIG. 1 and to the right in FIG. 3) from the log holder. The torque caused by the weight of log 10 is balanced by counterweight 14 that depends from counterweight support 26, as described more fully below.

Base 12 comprises skids 16 and 18 that may each comprise a square or rectangular wooden member. Frame 20 includes horizontal rails 30 and 32 that are fastened directly to skids 16 and 18 respectively by bolts 34. Forward supports 36 and 38 extend upward in a converging manner from rails 30 and 32, respectively. Rear supports 40 and 42 are horizontally spaced from the forward supports and similarly extend upward in a converging manner from the rails. Bar 44 extends horizontally between the upper ends of forward support 36 and rear support 40, and bar 46 similarly extends between the upper ends of forward support 38 and rear support 42. Bars 44 and 46 add rigidity to the frame structure, and also provide the mounting means for auxiliary lower support 28, as described below. Additional rigidity is added to the frame by struts 48 and 50 (FIGS. 1 and 3) that angle upward from rails 30 and 32 respectively and have their upper ends connected to rear supports 40 and 42, respectively. The upper ends of rear supports 40 and 42 are interconnected by cross members 52.

Lower support 22 comprises lower plate 54 that is fastened to and extends between the upper ends of forward supports 36 and 38. Lower plate 54 includes upward facing contact surface 56 that has a approximately semicircular shape with a diameter approximately equal to the diameter of the largest log to be accommodated by the log holder. Lower plate 54 also includes upwardly facing auxiliary contact surface 58 that also has an approximately semicircular shape, but with a diameter smaller than that of contact surface 56.

Figure 2:
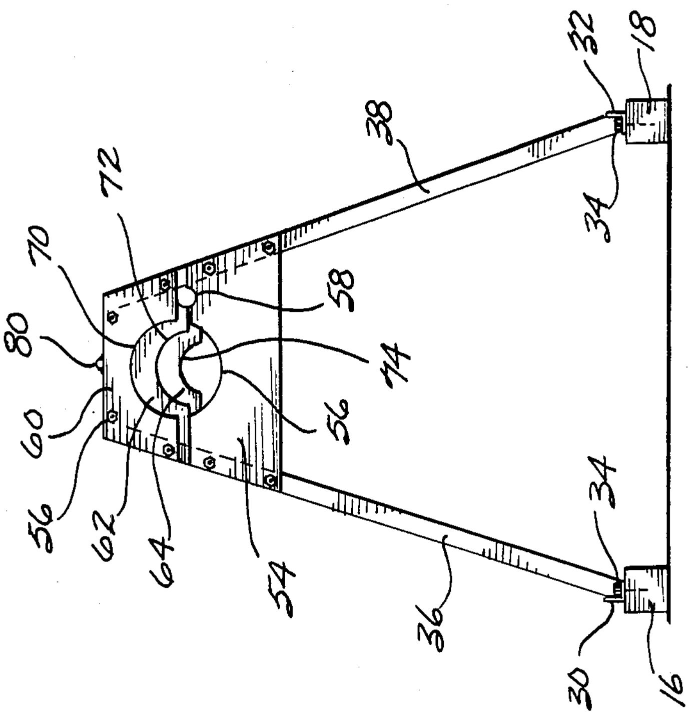
FIG. 2 is a front elevational view of the log holder of FIG. 1.

Upper support 24 is fastened to and extends between the upper ends of rear supports 40 and 42. The upper support comprises upper plates 60, 62 and 64 that are secured to one another in spaced-apart positions by bolts 66 and spacers 68. Upper plates 60, 62 and 64 respectively include downward facing contact surfaces 70, 72 and 74, respectively (FIG. 2). Contact surfaces 70, 72 and 74 have approximately semicircular shapes, and are concentrically positioned in the planes of the upper plates, the diameter of contact surface 70 being larger than the diameter of contact surface 72, and the diameter of contact surface 72 in turn being larger than the diameter of contact surface 74.

Upper plate 62 includes cut-out 76 that is aligned with auxiliary contact surface 58 of lower plate 54. Cut-out 76 has a semicircular shape and is formed in the lowermost edge of upper plate 62. A very small log may be supported by positioning the log such that it extends into cut-out 76 and rests on auxiliary contact surface 58. Upper support 24 also includes pointed projection 78 secured to the end of the one of bolts 66 that is aligned with auxiliary contact surface 58, and extending towards the lower support. Projection 78 may comprise an alloy steel point welded or threaded to a nut that is in turn threaded onto bolt 66. Projection 78 may be used to spear one end of a log in order to immobilize that end. When used in conjunction with lower support 22, projection 78 provides a convenient way for cutting short random-diameter logs, for example, 20-inch logs, into more useable lengths.

Counterweight support 26 comprises rod 80 that has S-shaped bend 81 at one of its ends and has hook 82 formed in its opposite end. S-shaped bend 81 extends partly through a suitable opening in cross member 52 and functions to maintain rod 80 in a horizontal position. Rod 80 is reinforced in its horizontal position by means of bracket 84 welded to the rod near hook 82 and struts 86 and 88 that extend upwardly and horizontally from rear supports 40 and 42 respectively to bracket 84. Hook 82 is adapted for receiving rope 90 through which counterweight 14 is supported.

Figure 4:
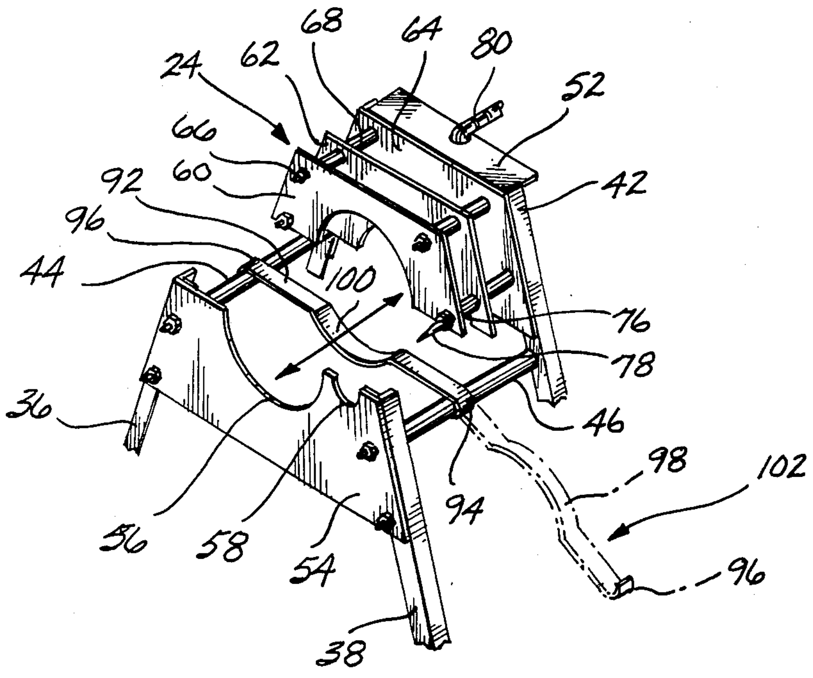
FIG. 4 is an enlarged perspective view showing the auxiliary lower support.

With reference to FIG. 4, auxiliary lower support 28 comprises metallic strap 92 that has tubular section 94 formed in one end and lip 96 formed in its opposite end. Central section 98 of strap 92 includes contact surface 100 that has a generally arcuate shape. The strap is pivotally mounted to bar 46 by tubular section 94. When the strap is in its active position, indicated in solid lines in FIG. 4, the strap extends laterally between bars 44 and 46, such that contact surface 100 faces upward and is horizontally positioned between the upper and lower supports. When so positioned, the contact surface in combination with contact surface 56 of lower plate 54 is capable of providing two-point suspension for a short log. Strap 92 can be slid forward and back along bars 44 and 46, as indicated by the arrows in FIG. 4, to vary the distance between contact surface 100 and contact surface 56 to accommodate various log lengths. When not in use, strap 92 can be swung upward and away from bar 44, as illustrated by phantom position 102 in FIG. 4.

The log holder of the present invention is used by positioning the log holder in a convenient location and hanging counterweight 14 on hook 82. Because skids 16 and 18 extend under hook 82, counterweight 14 does not render the log holder unstable. A log may then be positioned in the log holder, as indicated by log 10 in FIG. 1. One end of the log is positioned under one of contact surfaces 70, 72 or 74, the selected contact surface generally being the smallest contact surface having a diameter greater than the log diameter. The end of the log extends for a short distance in a rearward direction from the selected contact surface. For contact surfaces 70 or 72, the end of the log preferably abuts upper plate 62 or 64 respectively. In the case of contact surface 74, the end of the log preferably extends a short distance rearwardly from the contact surface. The length of spacers 68 is preferably selected to create an overlap of about 1–2 inches to prevent accidental slippage of the log out from under the contact surface.

Once the log has been positioned in the log holder, the log may be cut into convenient lengths, preferably starting from the unsupported end of the log and working toward the log holder. When the final cut is made, the overhanging weight of log 10 may be insufficient to cause the log to firmly seat against one of the upper contact surfaces. In such a situation, strap 92 may be positioned across bars 44 and 46, to provide a second point of lower support and to secure the log more firmly in the log holder.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A holder for supporting an elongated object such as a log by engaging one end thereof, the holder comprising:

a base;

a frame extending upwardly from the base;

a lower support mounted to the frame above the base and having an upwardly facing first contact surface;

an upper support mounted to the frame above the base, the upper support comprising a plurality of horizontally spaced plates, each plate including a lower side having an approximately semicircular cut-out section, and the cut-out sections of the plates comprising second contact surfaces, the diameters of the second contact surfaces decreasing in a first detection, the second contact surface being horizontally spaced from the first contact surface in the first direction, the lower and upper contact surfaces being vertically positioned with respect to one another such that one end of the elongated object can be supported therebetween in a generally horizontal orientation with the elongated object extending from the lower support in a second direction opposite the first direction; and a counterweight support mounted to the frame above the base and horizontally spaced from the upper support in the first direction.

2. The holder of claim 1, wherein the counterweight support comprises a horizontally extending bar having one end attached to the frame adjacent the upper support and attachment means for attaching a counterweight at its opposite end.

3. The holder of claim 2, wherein the base extends horizontally to a position beneath the attachment means, whereby the holder is stable with a counterweight attached but without the elongated object being supported between the upper and lower contact surfaces.

4. The holder of claim 1, further comprising a projecting member projection extending from the upper support in the second direction, the projecting member including a pointed end for spearing said one end of the elongated object.

5. A holder for supporting an elongated object such as a log by engaging one end thereof, the holder comprising: a base; a frame extending upwardly from the base; a lower support mounted to the frame above the base and having an upwardly facing first contact surface; an upper support mounted to the frame above the base and having a downwardly facing second contact surface, the second contact surface being horizontally spaced from the first contact surface in a first direction, the lower and upper contact surfaces being vertically positioned with respect to one another such that one end of the elongated object can be supported therebetween in a generally horizontal orientation with the elongated object extending from the lower support in a second direction opposite the first direction; a counterweight support mounted to the frame above the base and horizontally spaced from the upper support in the first direction; and an auxiliary support horizontally spaced from the lower support and having an upwardly facing third contact surface for supporting the elongated object, wherein the auxiliary support is mounted to the frame such that the auxiliary support can be laterally adjusted towards and away from the lower support.

6. The holder of claim 5, wherein the auxiliary support can be moved to an inactive position in which the auxiliary support does not engage the elongated object.

7. The holder of claim 6, wherein the frame includes first and second bars extending horizontally between the upper support and the lower support, and wherein the auxiliary support comprises a strap mounted on one of the bars such that the strap can be slid along said one bar to adjust the distance between the auxiliary support and the lower support, and such that the strap can be pivoted about said one bar between an active position in which the strap can support the lower side of the elongated object and an inactive position in which the strap hangs from said one bar.

8. The holder of claim 5, further comprising a projecting member extending from the upper support in the second direction, the projecting member including a pointed end for spearing said one end of the elongated object.

* * * * *